Feb. 7, 1961 R. B. LAWRANCE ET AL 2,970,732

TAPE STABILIZING APPARATUS

Filed March 7, 1958 3 Sheets-Sheet 1

INVENTORS:

Richard B. Lawrance and Robert A. Pendleton,

BY Bair, Freeman & Molinare

ATTORNEYS.

Feb. 7, 1961 R. B. LAWRANCE ET AL 2,970,732

TAPE STABILIZING APPARATUS

Filed March 7, 1958 3 Sheets-Sheet 2

INVENTORS:
Richard B. Lawrance and
Robert A. Pendleton.

BY Bair, Freeman & Molinare
ATTORNEYS.

Feb. 7, 1961 R. B. LAWRANCE ET AL 2,970,732

TAPE STABILIZING APPARATUS

Filed March 7, 1958 3 Sheets-Sheet 3

INVENTORS:
Richard B. Lawrance and
Robert A. Pendleton,
BY Bair, Freeman & Molinare
ATTORNEYS.

United States Patent Office 2,970,732

Patented Feb. 7, 1961

2,970,732

TAPE STABILIZING APPARATUS

Richard B. Lawrance, Winchester, and Robert A. Pendleton, Dedham, Mass., assignors to Minneapolis-Honeywell Regulator Company, Minneapolis, Minn., a corporation of Delaware Filed Mar. 7, 1958, Ser. No. 719,877

9 Claims. (Cl. 226—50)

This invention relates generally to apparatus for handling flexible members, and more particularly to new and improved apparatus for facilitating the movement of an elongated tape such as a record tape having information stored thereon.

In numerous applications, it is desirable to store information on an elongated record tape of the type having a magnetizable surface. The information generally is written onto and read out of the tape by means of one or more suitable electromagnetic data transfer heads as the tape is driven by a tape transport past the data transfer heads.

Conveniently, the information stored on the tape is recorded in discrete groups or blocks of magnetic impulses, commonly called informational blocks. When used in the field of data processing, for example, these informational blocks may be called for by the associated data processing equipment in a continuous flow of blocks or the information may be called for a single block at a time. The time required for scanning one such block may typically be on the order of five or ten milliseconds, and the times required to decelerate from full speed to zero speed or to accelerate from rest to full speed may typically be on the order of five milliseconds. Since successive starting, stopping and re-starting operations may occur at intervals of a few milliseconds or less, and since re-starting may be either in the initial direction or the opposite direction, and as the tape speed during the driving interval is relatively high, several troublesome problems have arisen in prior art tape handling devices.

Thus, it has been found that there is a tendency for various troublesome kinds of flutter to be set up in the tape as a result of the rapid starting, stopping, and restarting of the tape movement. Such tape flutter is highly undesirable in data processing operations for it often results in undesirable speed variations in the tape motion past the data transfer head, and in the closeness of contact between the tape and the data transfer head.

It will be readily appreciated by those skilled in the art that variations in the speed of the tape and other unwanted tape movements in the vicinity of the head can lead to faulty writing of informational pulses onto the tape or faulty reading therefrom, if the tape movement characteristics fall outside of prescribed limits.

In one known type of tape handling apparatus, a portion of the tape is maintained in a loop chamber provided between each tape supply reel and tape driving capstan. Advantageously, the tape in such loop chambers is maintained under tension due to the action of atmospheric pressure exerted on one broad surface of the tape and opposed by a subatmospheric pressure on the opposite surface of the tape. It sometimes happens, however, that parasitic vibrations of the tape in the loop chamber are caused by the air-flow associated with this difference in pressure, the variations in tape tension associated with these parasitic vibrations being propagated in significant degree along the tape to the vicinity of the driving capstan and the data transfer head. Such tape vibrations are undesirable due to their effect on the tape movement adjacent to the data transfer head, as explained above, and in those instances where the tape vibrations from rapid starting and stopping, and from parasitic loop chamber vibrations, act cumulatively the combined variations in tape movement can result in serious errors in machine operation.

Accordingly, it is a general object of this invention to provide new and improved means for controlling tape movement in a tape handling apparatus.

More specifically, it is an object of this invention to provide improved means for reducing tape vibration and speed variation in tape handling apparatus.

It is another object of this invention to provide damping means positioned adjacent to the rotating capstan or capstans of a tape handling device which is adapted to damp the lateral movement of the tape as it is driven away from the capstan.

It is still another object of this invention to provide such damping means which include guide members for trapping air in back of the tape to further damp the lateral movement of the tape adjacent to the tape driving capstan.

It is a further object of this invention to provide new and improved means for reducing tape vibration and speed variation which stabilizes the tape by adding a stiffening effect thereto to maintain the tape relatively rigid while it is in the loop chamber.

It is a still further object of this invention to provide new and improved means for tape handling apparatus which reduces parasitic tape vibration due to pressure differentials in a differential-pressure loop chamber.

It is a still further object of this invention to provide new and improved tape handling apparatus as described above which is characterized by its efficiency, its relative simplicity, and its economy of construction.

These and other objects are realized in accordance with a specific illustrative embodiment of this invention which comprises a dynamic stiffener and tape guide positioned immediately adjacent to each of the tape drive capstans, and specially constructed side members for each of the loop chambers.

In accordance with a feature of this invention, the space between each capstan and its associated loop chamber is fitted with a dynamic stiffener, which advantageously consists of a peeler plate and a pair of side plates, the latter serving also as guides for the tape as it is fed onto or is driven off the capstan adjacent to the stiffener. The peeler plate is preferably formed with a relatively sharply rounded edge, the latter being positioned closely adjacent to the curved surface of the capstan and substantially parallel thereto, the flat outer surface of the peeler plate lying in a plane essentially tangent to the capstan curved surface. As tape leaves a driving capstan, with whose surface it is in intimate driving engagement, the tape is parted cleanly from the capstan by the peeler plate edge and the tape is then stably guided toward the associated loop chamber by the combined action of the side plates and the flat surface of the peeler plate. As explained in greater detail below, any tendency to rapid and violent lateral motion of the tape, particularly as the tape is stopped and started, is substantially completely damped out by the structure described, thereby greatly reducing the problem of unwanted perturbations of tape motion adjacent to the data transfer head.

In accordance with a further feature of this invention, each side of the loop chamber structure with which the wide surface of the tape comes in contact, is formed with an arcuate surface, so that the pressure differential which presses the tape against these sides elastically deforms the cross section of the tape into a generally similar arcuate shape. As explained in greater detail below, this construction alters the flow of leakage air between the tape and loop chamber sides in such a way as to minimize the tendency of this leakage air to excite parasitic loop chamber oscillations. Additionally, the slightly curved cross-section imparted to the tape advantageously stiffens the tape against lateral vibrations over those portions of its length where it is not in contact with the loop chamber sides or other solid members.

The above and other features of novelty which characterize the invention are pointed out with particularity in the claims appended to and forming a part of this specification. For a better understanding of the invention, its advantages, and specific objects attained by its use, reference is had to the accompanying drawing and descriptive matter in which is shown and described an illustrative embodiment of the invention.

Figures 1, 2:
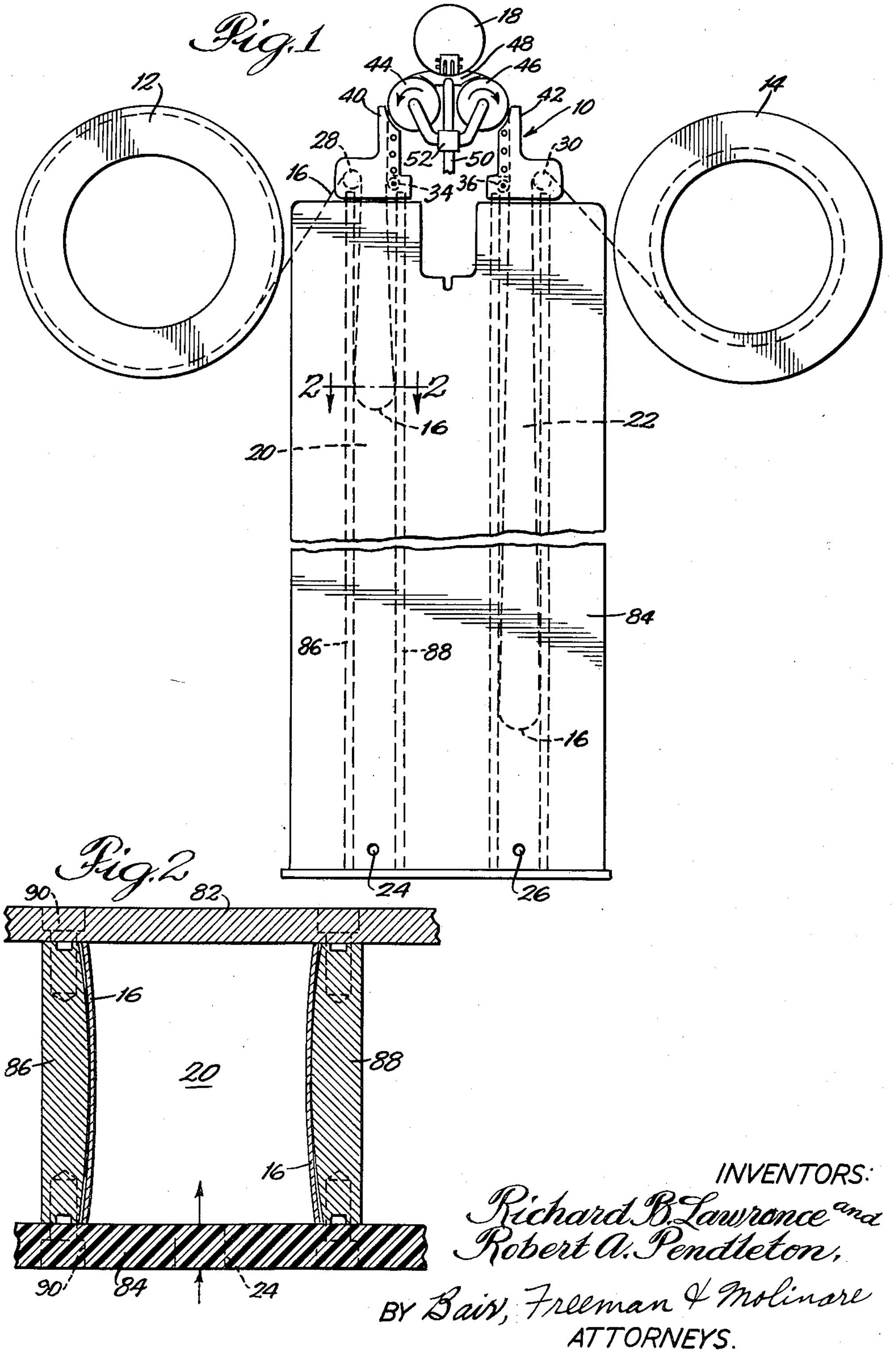
Figure 1 is a diagrammatic showing of a tape handling apparatus embodying the present invention.
Figure 2 is a cross-sectional view taken substantially as shown on line 2—2 of Figure 1 showing the arcuate construction of the loop chamber sides.

Referring now to the drawing and more particularly to Figure 1, the numeral 10 represents one type of tape handling apparatus with which the present invention advantageously may be used. Tape handling apparatus 10 comprises a pair of tape supply reels 12 and 14 which are arranged to be reversibly driven by suitable motor means, not shown. The reels 12 and 14 carry a tape 16 which may conveniently take the form of a magnetic tape upon which information may be stored by means of electrical impulses. Although any form of magnetic tape known in the art may be used with the invention, advantageously, tape 16 may be formed by placing a layer of magnetic material between two layers of a suitable plastic material, such as Mylar, to form a sandwich type construction. The underside of the tape preferably is formed of a relatively heavy layer compared to the top side which is placed under the information transfer head 18.

The tape 16 is arranged to pass through a pair of elongated loop chambers 20 and 22 which are arranged to maintain the tape 16 under tension due to the action of the pressure differential between the top side of the tape as illustrated and the under side of the tape.

Advantageously, such pressure differentials can be provided by suitable suction means connected to the outlet conduits 24 and 26. The tape is guided into the loop chambers 20 and 22 by suitable tension bars 28 and 30 as well as by the guide pins or rollers 34 and 36, all of which are formed as integral parts of the dynamic stiffener means 40 and 42 embodying the present invention.

An informational or data transfer head 18 is positioned to engage the tape 16 for magnetic transfer of the information to and from the record tape. The movement of the tape 16 past the transfer head 18 advantageously is effected by a pair of contra-rotataing capstans 44 and 46 positioned at either side of the transfer head 18. Although any suitable means for moving the tape 16 into driving relation with respect to one or the other of the driving capstans may be used with the invention to effect movement of the tape in one direction or the other, the contra-rotating capstans 44 and 46 may advantageously be of the pneumatic type and it will be so assumed for the purposes of explaining the operation of the invention in this specification.

The braking of tape 16 with respect to the transfer head 18 is accomplished by the brake member 48 which also may be of the pneumatic type. The sudden application of a reduced pressure to either of the capstans 44 or 46 or to the brake 48, is selectively controlled by a suitable pneumatic switching block having suitable control circuits for selectively transferring the vacuum signal from the inlet conduit 50 to the block 52 and to its desired capstan or brake line. Although not shown, the pneumatic switching block may also include means for applying suitable lubricating flows of air to some or all of those surfaces not actively engaged to the tape at the movement, and means for applying rapid transient pressures for facilitating transfer of the tape from one engaging surface to another. The details of one such electro-pneumatic control circuit suitable for use with the invention may be seen in the co-pending application of R. A. Pendleton, Serial No. 586,209, filed May 21, 1956, now Patent No. 2,866,638.

In considering the operation of the apparatus shown in Figure 1, it should be first noted that, whether for recording or reading purposes, it is desired to move the tape 16 past the information transfer head 18 at a predetermined rapid rate which is suitable for producing a transfer of information between the head and the tape. Such a speed may be, for example, 100 inches per second, and the capstan diameter and rotation speed are chosen to produce this linear surface speed for driving the tape.

Consider the acceleration of the tape from rest to a speed of 100 inches per second, and in particular the forces acting on the tape in the region between the driving capstan and the associated loop chamber. Since the actual time for the acceleration process is approximately two milliseconds, the acceleration of the tape exceeds 100 times the acceleration of gravity. It is desired that the accelerating tape flow smoothly along a path consisting of a circular arc, where it is in contact with the capstan, joined to a tangential straight line, where it leaves the capstan and drops to the loop chamber. Even with considerable tension in the tape, produced by the pressure differential in the loop chamber, the accelerations are sufficiently great so that the tape in the vicinity of the capstan behaves momentarily in a flabby fashion. In the absence of a dynamic stiffener, the tape contour between the capstan and the loop chamber may depart considerably from the desired straight line, as indicated by the dashed lines in Figure 3A. With pneumatic capstans having angularly segmented surfaces, the transient tape contour may have either of the extreme shapes shown, or various intermediate shapes, depending on the angular position of the capstan at the instant that the pneumatic engaging signal is applied. It is obvious from Figure 3A that an undesirable large flutter of the tape can thereby become established, particularly when it is considered that starting and stopping operations can follow in rapid succession, with the deflections resulting from earlier start operations propagating along the tape and persisting with relatively little damping. What is required therefore, is a means for decreasing the amount by which the tape departs from the ideal straight line segment during the process of accelerating and also for rapidly dissipating the energy involved in this lateral flutter, so that no deflection remains anywhere along the tape at the time of the next acceleration.

In accordance with a feature of this invention, such tape flutter is damped by a unique damping member positioned adjacent to each of the tape driving capstans. As shown in greater detail in Figures 4 and 5, the tape damping member advantageously comprises a sharp edged center plate 60, hereinafter referred to as a peeler plate, positioned between a pair of side plates 62 and 64. Peeler plate 60 is formed with a generally flat rectangular lower portion 66 with which is associated an upper portion 68 having a flat surface 70 at one side thereof and a concave arcuate surface 72 at the other side thereof, said flat and arcuate sides terminating in a generally narrow sharply rounded edge 74. Peeler plate 60 is secured to the side plates 62 and 64 by means of suitable fastening means 76, and in the practice of the invention, the tape damper is positioned adjacent to its capstan so that the edge 74 of the peeler plate is parallel to the capstan axis, while the surface 70 lies substantially along the vertical tangent to the capstan surface.

The side plates 62 and 64 are separated by a distance a few thousandths of an inch greater than the width of the tape, and function as edge guides for the tape as it is fed onto or driven off of the capstan. In addition, the guide plates 62 and 64 function as support plates for other parts of the assembly. Advantageously, a guide pin or roller 34 is provided adjacent to the lower edge of the peeler plate 60 for minimizing friction upon the tape as it passes into the loop chamber 20. Roller 34 is supported on a suitable bearing 78 extending through and supported by the side plates 62 and 64. The peripheral surface of the roller 34 is provided with a very smooth surface and further extends a slight distance beyond the surface of the plate 60 to form a slight space between the tape and the plate 60.

The desired flutter-reducing effect is cooperatively produced by the peeler plate 60, the side plates 64 and 62, and the roller 34 in the following manner: the tape in its normal straight configuration between the capstan and the roller 34 forms one boundary of a wedge shaped volume of air. If the tape were to flutter outwardly, as shown by the dashed line of Figure 3A, the volume of this enclosed air would have to increase rapidly by a large fraction, which can only occur if additional air can flow easily into the wedge shaped region, or if the density of air in the wedge shaped region decreases greatly. Since the clearance between the edge of the tape and the side plates 62 and 64 is only one or two thousandths of an inch, and since the other air passages past the edge 74 and the roller 34 are highly restricted, the net volume of enclosed air is constrained to remain substantially constant during the interval of acceleration. It results that the maximum lateral displacement of the tape attains the form shown in Figure 3B. As seen by a comparison of Figures 3B and 3A, the maximum displacement with the dynamic stiffener in place is greatly reduced from that obtained with no dynamic stiffener. Furthermore, the smaller oscillations which remain are very highly damped by oscillatory longitudinal flow of the air in the confined region between the tape and the surface 70. By this means there is obtained the desired result of damping the oscillations due to one acceleration operation before the next acceleration or deceleration operation occurs, thereby preventing cumulative buildup of flutter to a point where it can adversely affect the performance.

Figures 4, 5:
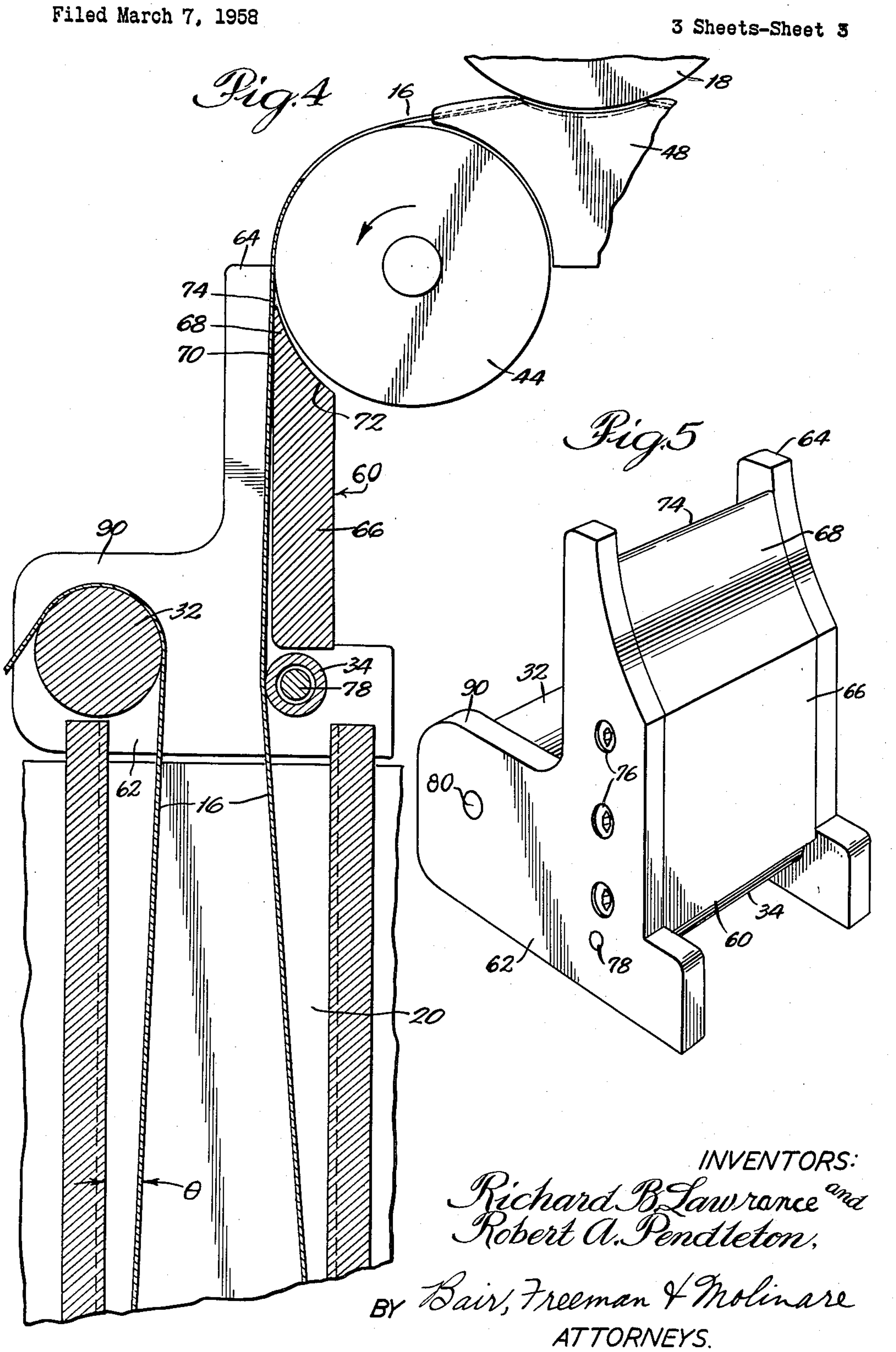
Figure 4 is a cross-sectional view of a portion of the tape handling apparatus showing the construction of the dynamic stiffener and the loop chamber side plates.
Figure 5 is a perspective view of an illustrative dynamic stiffener embodying the invention.

The remaining portions of the dynamic stiffener assembly shown in Figures 4 and 5 are the outer edge guides 90; roller 34 and the tension bar 32. The function of these portions of the dynamic stiffener is not concerned with the stiffening action, but rather with the proper guiding of tape from reel into the loop chamber, and from the loop chamber on to the reel. Conveniently, the tension bar 32 is supported by side plates 62 and 64 and the guide pin or roller 34 is supported by bearings 78 inserted through and supported by side plates 62 and 64. The tension with which the tape emerging from the loop chamber is wound up on the associated reel is controlled by varying the relative proportions and positions of the roller 34 and the tension bar 32 and by varying the angle of wrap about the tension bar 32. Although only one roller and one tension bar are shown in Figure 4, it will be apparent to those skilled in the art that additional rollers or tension bars may be utilized, as desired. For example, in one advantageous embodiment (not shown) a tension bar 32 may be replaced by a smaller tension bar in spaced relation with a roller so that the functions of tape tension and tape guidance may be selectively controlled as the tape passes over the spaced tension bar and roller when it emerges from the loop chamber.

From the foregoing discussion, it can be seen that the peeler plate 60, the side guide plates 62 and 64, the tension bar 32 and the guide pin 34 are joined in a relatively strong yet compact composite unitary structure adapted to be positioned adjacent to the tape driving capstan for effectively peeling the tape from the capstan as it is being driven by the capstan. Further, this structure serves to damp out rapid lateral movements of the tape and consequently, reduces the tape vibration. Further, this structure provides guiding means for assuring proper tracking of the tape, and tensioning means for providing proper windup on the reels.

In accordance with a further feature of this invention, unwanted vibrational effects of the tape in the loop chamber are further reduced by a unique construction of the loop chambers into which the tape is fed from either a supply reel or a driving capstan. As shown in greater detail in Figures 2 and 4, each loop chamber is comprised of opposed front and rear panels 82 and 84, respectively, and a pair of opposed side panels 86 and 88, respectively. These panels are joined by suitable fasteners 90 to form an elongated substantially rectangular enclosure for the tape in the loop chamber.

Advantageously, the rear panel 84 is provided with an outlet conduit, such as conduit 24, for providing desired sub-atmospheric pressures at the lower portion of the loop chamber below the tape 16. As the chamber above the tape is shown to have atmospheric pressure therein, a pressure differential will exist between the upper and lower surfaces of the tape and this pressure differential serves to maintain the tape under tension in the loop chamber.

In accordance with the invention, each of the side panels 86 and 88 of the loop chamber is constructed with an arcuate surface which, as explained below, serves to reduce unwanted vibrational effects which can adversely affect the tape under certain operating conditions. In order to understand these unwanted vibrational effects, consider first a loop chamber side plate which is flat in accordance with the prior art constructions and as illustrated in Figure 6.

Figures 3A, 6:
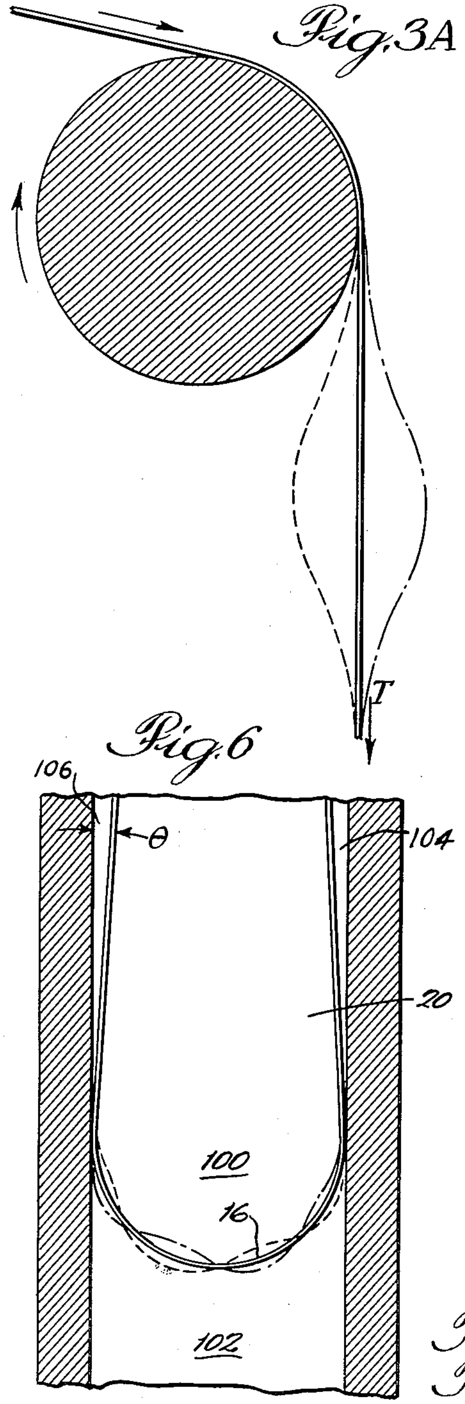
Figures 3A and 3B are a pair of cross-section views of the tape and a driving capstan, showing the lateral motion of the tape respectively with and without the dynamic stiffeners of the invention.
Figure 6 is a diagrammatic showing of the contour of a tape in a loop chamber, showing the form of parasitic oscillation which is suppressed by tthe present invention.
Figure 3B:
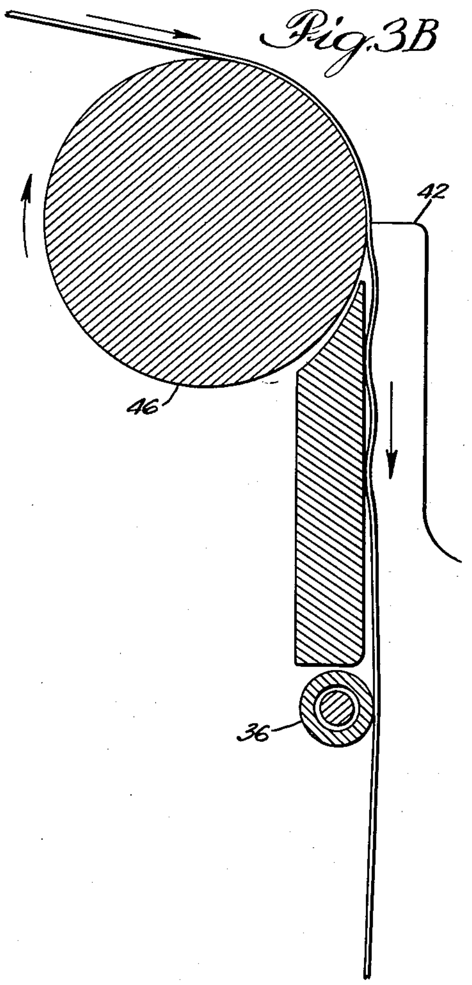

The tape at rest or in motion in the loop chamber assumes a contour consisting of two straight line segments and a semi-circle, as shown in Figure 1 and in greater detail in Figure 6. In order to reduce friction and wear and in order to eliminate rubbing electrification of the tape, the straight line segments are made to lie at an angle Θ with the vertical sides of the loop chamber rather than being parallel to and in contact with a major portion of the loop chamber sides. These angles Θ are produced by the offset of the rollers 34 and the tension bar 32 in relation to the sides of the loop chamber, as shown in Figure 4. It is evident that when the position of the semi-circular lower portion of the tape loop is in the upper part of the loop chamber, the angle Θ assumes its maximum value, which may be sufficiently large so that unwanted parasitic oscillations of the form shown in Figure 6 are encountered. The tape divides the loop chamber into four portions consisting of the upper portion 100 at essentially atmospheric pressure; the lower portion 102 at the suction loop chamber section pressure and the two wedged shape upper side portions 104 and 106 whose pressure is normally essentially atmospheric but which are subject to pressure and velocity oscillation in the region where the tape contacts the loop chamber sides. Due to the pressure differential between the regions 104 and 102 and between regions 106 and 102 there is a tendency for air to flow downward between the tape and the wall. When the angle θ exceeds a critical value, which depends on the pressure differential in the loop chamber and on the configuration of the loop chamber sides, a vigorous oscillation of the tape occurs, as shown by the dashed lines in Figure 6. In this oscillation the apexes of the two regions 104 and 106 where the tape contacts the walls alternately shrink and expand, with the inertia of the tape, the inertia and elasticity of the air, the Bernonilli effect of the moving air, and the eddies of air in the vicinity of the walls below 104 and 106 co-operating to maintain vigorous oscillatory motion. As shown, when wedge 104 is contracting, wedge 106 is expanding, so that the two sides cooperate in push-pull fashion to maintain the oscillation. By giving an arcuate form to the sides of the loop chamber it is possible to alter the structure of the air jets and eddies so that this unwanted oscillation is excited much less vigorously than if the sides are made flat, as in the prior art.

It will be further appreciated by those skilled in the art that still another highly advantageous result in utilizing the arcuate side panels in the loop chambers is the stiffening effect which is gained by slightly bowing the tape. Thus, as shown in Figure 2, the pressure differential between the front and back of the tape causes the tape to be slightly bowed with the center of the tape in contact with he vertical center line of each of the side panels. The bowing of the tape in this manner in the loop chamber tends to maintain the tape rigid along its length and increases the damping of incipient oscillations thus further stabilizing the tape in the loop chamber.

It will be apparent from the foregoing description that there has been provided a new and improved apparatus for quieting or stabilizing the motion of the tape adjacent to the recording head and restricting the tape movement to that which is necessary to effect a transfer of data between the tape and the associated data transfer head.

It will be appreciated by those skilled in the art that modifications may be made in the construction and arrangement of the parts in the above-described tape handling apparatus without departing from the real purpose and spirit of the invention, and that it is intended to cover by the appended claims any modified forms of structures, or use of equivalents which reasonably may be included within their scope.

What we claim as our invention is:

1. Tape handling apparatus for a record tape comprising a pair of contra-rotating driving capstans, means for placing the record tape into driving relation with respect to one or the other of said driving capstans to effect movement of the tape in one direction or the other, and dynamic stiffening means positioned immediately adjacent each of said driving capstans for damping lateral movements of the tape as it is driven away from said capstans, said dynamic stiffening means comprising a plate formed with a generally flat surface at a side thereof remote from said capstans and a concave arcuate surface at a side thereof adjacent said capstans.

2. Tape handling apparatus for a record tape comprising a pair of contra-rotating driving capstans, means for placing the record tape into driving relation with respect to one or the other of said driving capstans to effect movement of the tape in one direction or the other, and dynamic stiffening means positioned immediately adjacent each of said driving capstans for damping lateral movements of the tape as it is driven away from said capstans, said dynamic stiffening means comprising a plate formed with a generally flat surface at a side thereof remote from said capstans and a concave arcuate surface at a side thereof adjacent said capstans, said flat and arcuate surfaces terminating in a narrowed edge projecting tangentially of the capstan surface for effectively peeling off the tape as it is driven from the capstan.

3. Tape handling apparatus for a record tape comprising a pair of reels, a pair of contra-rotating driving capstans, means for moving the record tape into driving relation with respect to one or the other of said driving capstans to effect movement of the tape in one direction or the other between said reels and said capstans, a loop chamber for receiving the tape between each reel and its associated capstans, means for maintaining the tape under tension in each loop chamber by providing pressure differentials between the top and bottom of the tape, and means for reducing tape vibration in said loop chamber caused by said pressure differentials comprising a pair of opposed side panels in each loop chamber, each of said side panels having an arcuate surface for causing a bow to be formed in the tape as it is positioned with the loop chamber.

4. The improvement of tape damping and stabilizing means for tape handling apparatus of the type having a rotating driving capstan for moving the tape in a desired direction comprising a pair of spaced guide plates positioned adjacent the driving capstan and being spaced relative to each other by a distance which is substantially equal to but slightly greater than the width of the tape and a peeler plate positioned intermediate said spaced guide plates and having its end walls secured in contacting relation thereto, said peeler plate having a relatively sharp forward edge and an elongated surface projecting tangentially of the capstan's surface for receiving the tape as it comes off the capstan and extending an appreciable distance from said edge, said guide plates and said peeler plate serving to form an enclosure with the tape passing thereover to trap air behind that section of the tape adjacent said plate so that rapid lateral movements of the tape cannot take place.

5. The improvement of tape damping and stabilizing means for tape handling apparatus of the type having a rotating driving capstan for moving the tape in a desired direction comprising a loop chamber positioned adjacent said driving capstan for receiving tape to be fed onto or to be driven off said capstan, means for providing atmospheric pressure differentials at the front and back of said tape to maintain the tape in tension in said loop chamber, and means for stiffening and stabilizing the tape in said loop chamber by breaking up the air flow adjacent said tape resulting from said atmospheric pressure differentials, said latter means comprising arcuate elongated panel members positioned at opposite sides of said loop chamber.

6. The improvement of tape damping and stabilizing means for tape handling apparatus of the type having a rotating driving capstan for moving the tape in a desired direction comprising a peeler plate positioned adjacent the driving capstan and having a relatively sharp edge projecting tangentially of the capstan's surface for receiving the tape as it comes off the capstan, a loop chamber positioned adjacent said driving capstan for receiving tape to be fed onto or to be driven off said capstan, means for providing atmospheric pressure differentials at the front and back of said tape to maintain the tape in tension in said loop chamber and means for stiffening and stabilizing the tape in said loop chamber comprising arcuate elongated panel members positioned at opposite sides of said loop chamber.

7. The improvement of tape damping and stabilizing means for tape handling apparatus of the type having a rotating driving capstan for moving the tape in a desired direction comprising a pair of spaced guide plates positioned adjacent the driving capstan, a peeler plate positioned intermediate said guide plates and secured thereto, said peeler plate having a relatively sharp edge projecting tangentially of the capstan's surface for receiving the tape as it comes off the capstan, said guide plates and said peeler plate serving to trap air behind the tape so that rapid lateral movements of the tape can not take place, a loop chamber positioned adjacent said driving capstan for receiving tape to be fed onto or to be driven off said capstan, means for providing atmospheric pressure differentials at the front and back of said tape to maintain the tape in tension in said loop chamber and means for stiffening and stabilizing the tape in said loop chamber by breaking up the air flow adjacent said tape resulting from said atmospheric pressure differentials, said latter means comprising arcuate elongated bearing members positioned at opposite sides of said loop chamber.

8. A loop chamber for a flexible record tape comprising a pair of oppositely disposed and spaced apart side plates defining the loop chamber therebetween, said side plates adapted to have the planar side of the record tape engage the side of said plates within said chamber, at least one of said side plates having an arcuate surface adjacent the record member to slightly bow the record tape when in contact therewith.

9. A loop chamber for a flexible record tape comprising a pair of oppositely disposed and spaced apart side plates defining the loop chamber therebetween, said side plates adapted to have the planar side of the record tape engage the side of said plates within said chamber, at least one of said plates having an arcuate surface adjacent the record member to slightly bow the record tape when in contact therewith, and a loop chamber input guide comprising an elongated flat plate forming a bearing surface for the record tape as it is passed into or out of the loop chamber.

References Cited in the file of this patent

UNITED STATES PATENTS

| | | |
|---|---|---|
| 844,809 | King | Feb. 19, 1907 |
| 1,595,478 | Minton | Aug. 10, 1926 |
| 2,041,011 | Moreno | May 19, 1936 |
| 2,454,021 | Wilson | Nov. 16, 1948 |
| 2,778,634 | Gams et al. | Jan. 22, 1957 |

FOREIGN PATENTS

| | | |
|---|---|---|
| 958,832 | France | Mar. 17, 1950 |